Dec. 1, 1925.  
G. BARKER  
1,563,952  
SPRING SUSPENSION FOR VEHICLES  
Filed Oct. 9, 1923  
2 Sheets-Sheet 2

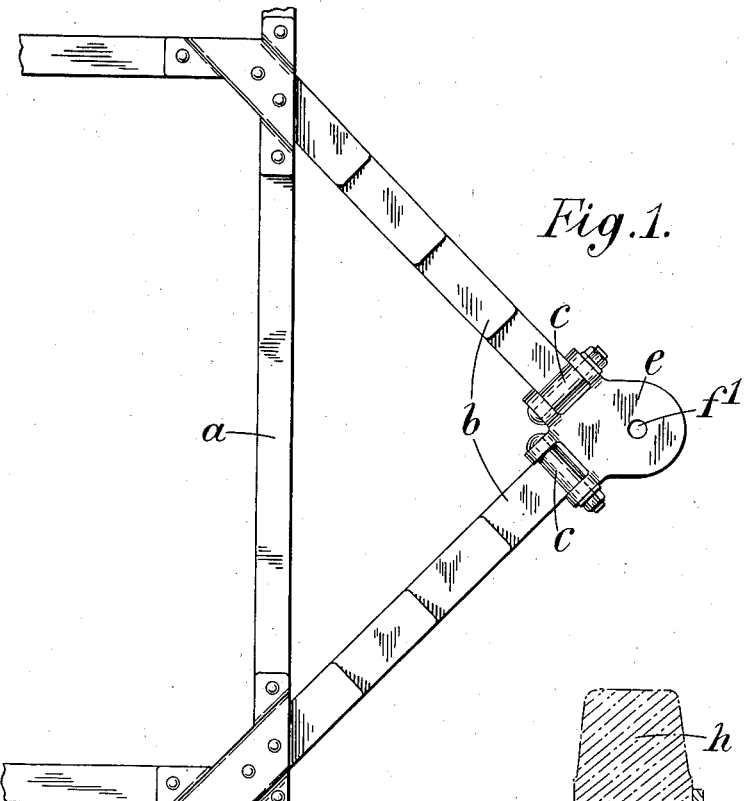
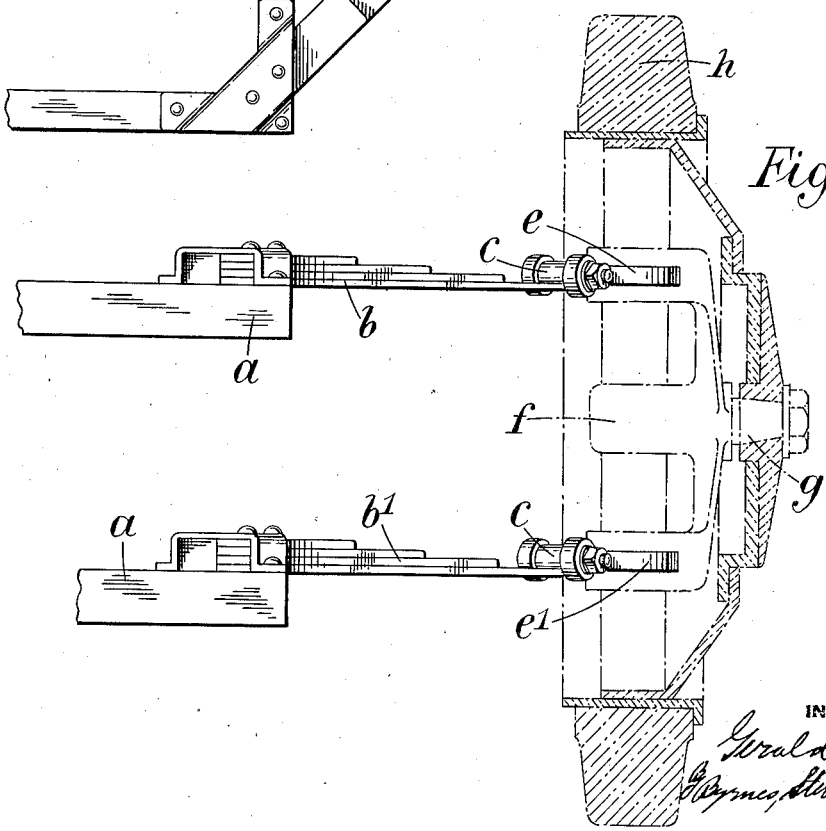

INVENTOR  
Gerald Barker

Patented Dec. 1, 1925.

1,563,952

UNITED STATES PATENT OFFICE.

GERALD BARKER, OF LONDON, ENGLAND.

SPRING SUSPENSION FOR VEHICLES.

Application filed October 9, 1923. Serial No. 667,447.

*To all whom it may concern:*

Be it known that I, GERALD BARKER, a subject of the King of England, residing at London, England, have invented certain new and useful Improvements in Spring Suspensions for Vehicles, of which the following is a specification.

This invention is for improvements in or relating to the springing of vehicles and has for its object to provide a means of springing vehicles in such manner that the road-wheel axles may be dispensed with.

According to this invention, the sole support between a wheel and the chassis comprises a boss which rotatably carries the wheel, and yieldingly controlled arms which extend divergently from the boss to the chassis, two from the top and two from the bottom of the boss in such manner that the points of connection of each pair make in plan a triangular frame.

One or both pairs of each set of yieldingly controlled arms may take the form of quarter-elliptic springs whose roots are secured to the chassis, or the arms themselves may be rigid, in which case they are hinged to the chassis and yieldingly controlled by separate springs, which may be for example quarter-elliptic springs the roots of which are secured to the inner ends of certain of the arms (preferably the lower ones) and which extend across the chassis and are secured thereto at their tips.

The yieldingly controlled arms may be so attached to the boss carrying the stub-axle of the wheel that the said boss can swing about a vertical axis for the purpose of steering the wheel.

Each wheel of the vehicle may be carried by two pairs of springs arranged as described above, and the driving of the wheel may be effected through a universal joint.

When such a universal joint is employed, the mechanism for imparting movement to the driving-member of the joint may take the form of bevel gearing mounted in a casing disposed at right-angles to the axis of rotation of the driving-member and having engaging-means, such as two or more spigots which enter sockets in the chassis to prevent rotation of this casing. In this manner, all the driving torque will be taken by the chassis instead of by the springs which carry the road-wheel.

It will be seen that each road-wheel can be independently carried by its two pairs of springs and that no axle connecting them in pairs is necessary; moreover, this method of springing has remarkable powers for absorbing vibration.

Two forms of the invention are illustrated in the accompanying drawings, in which—

Figure 1 is a plan of part of the chassis of a motor-vehicle and a spring suspension according to one form of the invention;

Figure 2 is a front elevation of Figure 1;

Referring to Figures 1 and 2, the chassis $a$ of a motor-vehicle has secured to it two pairs of quarter-elliptic springs $b$, $b^1$, which meet at their outer ends to form a triangular figure in plan, as shown in Figure 1. The meeting ends of the two pairs are pivoted at $c$ to two lugs $e$, $e^1$, to which is pivoted at $f^1$ a boss $f$. The springs $b$, $b^1$ and lugs $e$, $e^1$ constitute resilient supporting frames arranged one above and extending between the chassis and the bearing member. A short stub-axle $g$ rotates in this boss, and the road-wheel $h$ is secured to the outer end of the stub-axle.

Figure 3:
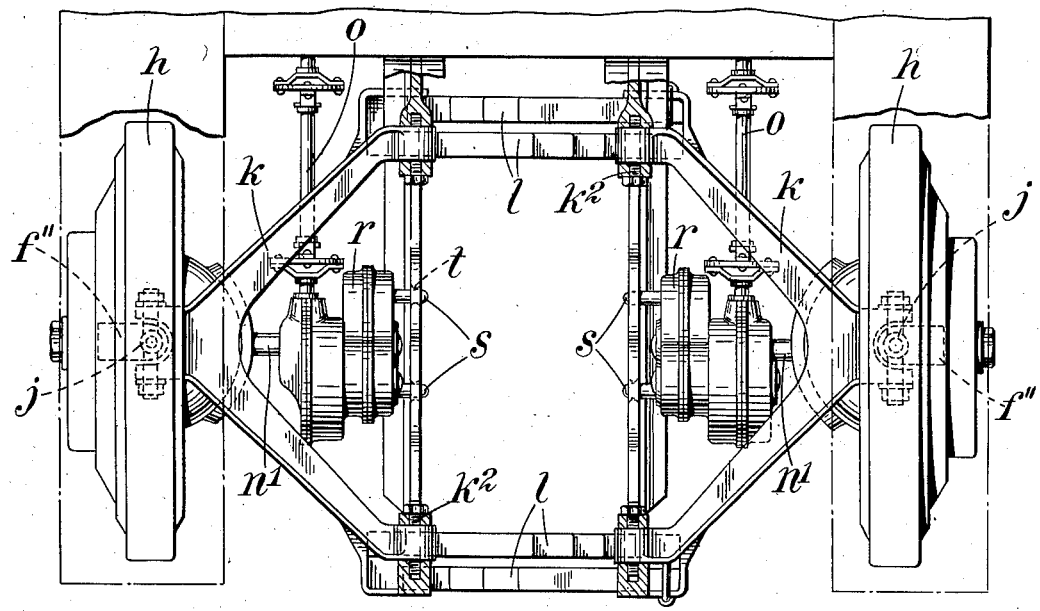
Figure 3 is a plan of part of a motor-vehicle provided with spring suspension and driving gear according to a second form of the invention.
Figure 4:
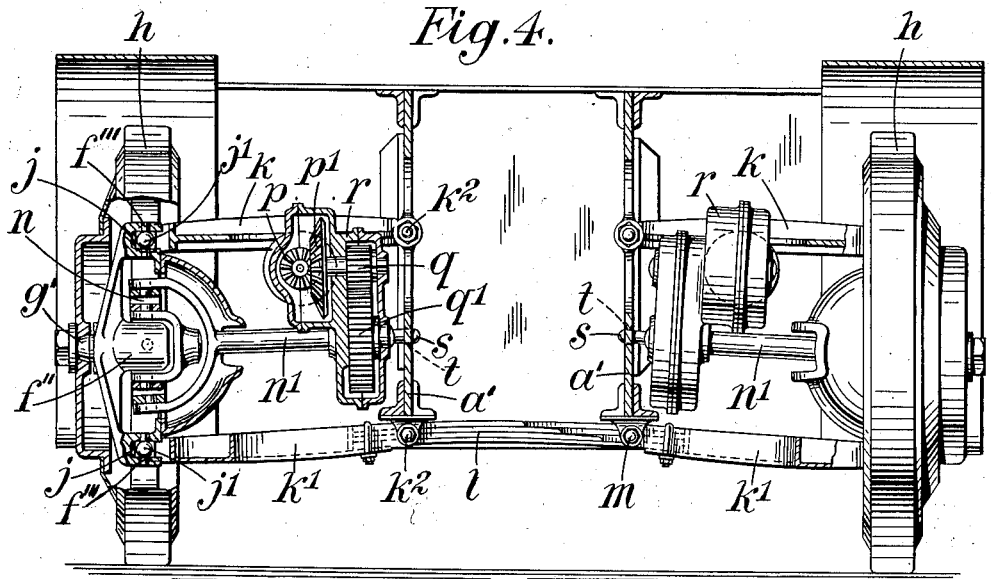
Figure 4 is a front elevation of Figure 3, with certain parts shown in section.

Referring now to Figures 3 and 4, the bosses $f''$ are pivoted at $f^{1''}$ to two lugs $j$ which are themselves hinged at $j^1$ to the outer ends of two triangular frames $k$, $k^1$ hinged to the chassis $a'$ at $k^2$. These two frames are equal in width between the hinges $j^1$ and $k^2$.

Two quarter-elliptic springs $l$ are rigidly secured by their roots to the two inner ends of each lower frame $k^1$. These springs extend across the gap between the side frames of the chassis $a'$, and are anchored at their tips, as at $m$, to the chassis. It will be seen that by this construction the arms $k$, $k^1$ are yieldingly controlled by the springs $l$, and that the boss $f''$ will move parallel to itself as the arms swing about their hinges.

The road-wheels $h$, supported as previously explained, upon stub-axles $g'$ rotating in the bosses $f''$, are driven through universal joints $n$. The road-wheel shafts $n^1$ are driven from the Cardan shafts $o$ through double reduction gearings each comprising bevel-gears $p$, $p^1$ and pinions $q$, $q^1$. These gears are mounted in casings $r$ which are each provided with two spigots $s$ which enter sockets *t* in the chassis. These spigots serve to take the torque due to the drive, and relieve the spring suspension members entirely of such torque.

I claim:—

1. In a vehicle spring suspension, in combination, a chassis member, a bearing member for a road-wheel, and resilient supporting means extending between the chassis and the bearing member and comprising two supporting frames attached to said bearing member one above the other, each embodying two arms separately attached at their inner end to the chassis member at points widely separated in the longitudinal direction of the vehicle and converging towards the wheel.

2. In a vehicle, a spring suspension comprising in combination, a chassis member, a bearing member for a road-wheel, two supporting frames one above the other and each consisting of a rigid integral double-armed structure pivoted to the said bearing member at the junction of the arms and having the ends of its arms separately pivoted to the chassis member at points widely separated in the longitudinal direction of the vehicle, and resilient means restraining movement of said radius-rods in the vertical direction.

3. In a vehicle, a spring suspension comprising in combination, a chassis member, a bearing member for a road-wheel, two supporting frames one above the other and each consisting of a rigid integral V-shaped member pivoted to the said bearing member at the point of the V and having the ends of its arms separately pivoted to the chassis member at points widely separated in the longitudinal direction of the vehicle, and resilient means restraining movement of said radius-rods in the vertical direction.

4. In a vehicle spring suspension, in combination, a chassis member, a bearing member for a road-wheel, and resilient supporting means extending between the chassis and the bearing member and comprising two supporting frames one above the other and each embodying a double armed structure attached to the said bearing member at the junction of the arms and having the ends of its arms separately attached to the chassis member at widely separated points situated in a horizontal line parallel to the longitudinal axis of the vehicle.

5. In a vehicle, a spring suspension comprising in combination, a chassis member, a bearing member for a road-wheel, two supporting frames one above the other and each consisting of an integral double-armed structure attached to the said bearing member at the junction of the arms and having the ends of its arms separately attached to the chassis member at points widely separated in the longitudinal direction of the vehicle, and leaf springs secured by their roots to the ends of the arms of one of said structures which springs extend inwards across the chassis and are anchored thereto at their tips.

6. In a vehicle, a spring suspension comprising in combination a chassis member, a laterally extending arm pivoted to said member, a bearing member for a road-wheel attached to the outer end of said arm, and a leaf spring secured by its root to the inner end of said arm which spring extends inwards across the chassis and is anchored thereto at its tip.

7. In a vehicle, a spring suspension comprising in combination, a chassis member, two supporting frames one above the other and each consisting of two arms separately attached at their inner ends to said member at points widely separated in the longitudinal direction of the vehicle, and converging together towards their outer ends, a bearing member for a road-wheel pivoted for steering to the outer ends of the arms about a vertical axis extending between the junction of the upper arms and the junction of the lower arms, resilient means restraining movement of said arms in the vertical direction, and means including a universal joint for transmitting power to the wheel.

8. In a vehicle, a spring suspension comprising in combination, a chassis member, two integral double-armed supporting frames pivoted one above the other at the ends of the arms to the said chassis member, resilient means restraining pivotal movement of the supporting frames, and a bearing member for a road-wheel pivoted to the supporting frames about a vertical axis between the free ends of the upper and lower radius-rods.

9. In a vehicle, a spring suspension comprising in combination, a chassis member, two laterally extending supporting frames one above the other and secured at their inner ends to the said chassis member, resilient means restraining vertical movement of said supporting frames, a road-wheel, a bearing member therefor pivoted to the supporting frames about a vertical axis between the outer ends of the upper and lower radius-rods, means including a universal joint and a reduction-gearing for transmitting power to the road-wheels, a casing for said reduction-gearing, and means thereon co-operating with the chassis member to prevent rotation of the casing.

10. In a vehicle, a spring suspension comprising in combination, a chassis member, two laterally extending supporting frames one above the other secured at their inner ends to the said chassis member, resilient means restraining vertical movement of said supporting frames, a road-wheel, a bearing member therefor pivoted to the radius-rods about a vertical axis between the outer ends of the upper and lower supporting frames, means including a universal joint and a reduction-gearing for transmitting power to the road-wheel, a casing for said reduction-gearing, spigots on said casing disposed on opposite sides of the axis of the driven member of the reduction-gearing, and means provided by the chassis member co-operating with said spigots to prevent rotation of the casing about an axis transverse to the vehicle.

In testimony whereof I affix my signature.

GERALD BARKER.